United States Patent
Savolainen et al.

(10) Patent No.: US 9,921,803 B2
(45) Date of Patent: Mar. 20, 2018

(54) AUDIO USER INTERFACE APPARATUS AND METHOD

(75) Inventors: Jari Tuomas Savolainen, Espoo (FI); Jukka Mikael Jalkanen, Vantaa (FI); Jyrki Porio, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 1180 days.

(21) Appl. No.: 13/817,957

(22) PCT Filed: Aug. 23, 2010

(86) PCT No.: PCT/IB2010/053788
§ 371 (c)(1),
(2), (4) Date: Feb. 16, 2014

(87) PCT Pub. No.: WO2012/025784
PCT Pub. Date: Mar. 1, 2012

(65) Prior Publication Data
US 2014/0201639 A1  Jul. 17, 2014

(51) Int. Cl.
*G06F 3/16* (2006.01)
*G10L 17/26* (2013.01)
*G10L 25/48* (2013.01)

(52) U.S. Cl.
CPC .............. *G06F 3/167* (2013.01); *G10L 17/26* (2013.01); *G10L 25/48* (2013.01)

(58) Field of Classification Search
CPC .......... G06F 3/167; G10L 17/26; G10L 25/48
See application file for complete search history.

(56) References Cited

U.S. PATENT DOCUMENTS

| 3,742,143 | A | | 6/1973 | Awipi |
| 4,063,035 | A | * | 12/1977 | Appelman ............ G09B 19/04 704/213 |
| 4,357,488 | A | | 11/1982 | Knighton et al. |
| 4,641,343 | A | | 2/1987 | Holland et al. |
| 5,457,769 | A | | 10/1995 | Valley |
| 5,963,639 | A | | 10/1999 | Kanamaki |
| 6,070,140 | A | | 5/2000 | Tran |
| 7,418,392 | B1 | | 8/2008 | Mozer et al. |
| 2002/0082834 | A1 | * | 6/2002 | Eaves ..................... G10L 15/10 704/251 |
| 2003/0101052 | A1 | * | 5/2003 | Chen ....................... G10L 15/10 704/223 |
| 2004/0001018 | A1 | * | 1/2004 | Hales .................... H03M 1/004 341/155 |
| 2004/0128137 | A1 | | 7/2004 | Bush et al. |

(Continued)

FOREIGN PATENT DOCUMENTS

WO    0076177 A1    12/2000

OTHER PUBLICATIONS

International Search Report and Written Opinion received in corresponding Patent Cooperation Treaty Application No. PCT/IB2010/053788, dated May 24, 2011. 12 pages.

*Primary Examiner* — Sonia Gay
(74) *Attorney, Agent, or Firm* — Harrington & Smith

(57) ABSTRACT

A method comprises converting an audio frequency domain signal into one or more voltage signals. Then the characteristics of the one or more voltage signals are determined. Afterwards the characteristics of the one or more voltage signals are compared with one or more characteristics of an audio trigger command. Activation of an audio user interface is then activated on the basis of the comparison.

22 Claims, 9 Drawing Sheets

(56) References Cited

U.S. PATENT DOCUMENTS

| | | | |
|---|---|---|---|
| 2005/0091066 A1* | 4/2005 | Singhal | G10L 25/78 |
| | | | 704/500 |
| 2006/0041597 A1* | 2/2006 | Conrad | G06F 17/30864 |
| 2007/0033036 A1* | 2/2007 | Guruparan | G10L 15/22 |
| | | | 704/251 |
| 2009/0253463 A1* | 10/2009 | Shin | H04M 1/72583 |
| | | | 455/563 |

\* cited by examiner

AUDIO USER INTERFACE APPARATUS AND METHOD

RELATED APPLICATION

This application was originally filed as PCT Application No. PCT/IB2010/053788 filed Aug. 23, 2010.

FIELD OF THE APPLICATION

The present application relates to a method and apparatus. In some embodiments the method and apparatus relate to an audio user interface.

BACKGROUND OF THE APPLICATION

Some known electronic devices use speech recognition. Electronic devices utilising voice commands and speech-to-text functionality can enable hands-free use and better accessibility. For example, a mobile phone with hands-free functionality enables a user to make a phone call or dictate a text message while driving a car.

One known way for a user to start a speech recognition function in an electronic device is to press a button or select the feature from a menu of the electronic device's user interface. This means that a user typically has to activate the speech recognition functionality with a hand or even both hands. However, a user may not be able to touch the electronic device to activate a speech recognition function. For example, a user may be washing dishes or riding a bicycle and does not want to touch or cannot touch the electronic device.

One proposal is to configure an electronic device so that a speech recognition function is on all the time. However, this may not be feasible because a processor may require large amounts of processing capacity which can consume too much power and drain a power cell of the electronic device too quickly. For example, a processor running a speech recognition function can draw a current in the order of a hundred milliamps from the power cell when calculating fast Fourier transform and processing audio to determine whether the audio contains spoken words.

In another known arrangement a signal is captured with an in-ear microphone, which detects a specific user humming sequence or a voice command. The ear piece attenuates surrounding noises from entering the ear canal making the user's voice to be easier to separate from other sounds. However, the detection of the voice command may similarly drain the power cell of an electronic device as quickly as permanently on speech recognition.

In one known arrangement a speech recognition function is activated when a user claps or whistles. Typically, the electronic device activates the speech recognition function when the user's clapping or whistling is over a certain volume. The arrangement is problematic and can lead to unnecessary activation of the speech recognition function, especially in noisy environments.

Embodiments of the application aim to address one or several of the above issues.

SUMMARY OF THE APPLICATION

In a first embodiment there is provided a method comprising; converting an audio frequency domain signal into one or more voltage signals; determining the characteristics of the one or more voltage signals; comparing the characteristics of the one or more voltage signals with one or more characteristics of an audio trigger command; and initiating activation of an audio user interface on the basis of the comparison.

Preferably the determining the characteristics of the one of more voltage signals comprises determining whether the one or more voltage signals are in one of a plurality of adjacent voltage ranges.

Preferably the plurality of voltage ranges are defined by a plurality of voltage comparators, the voltage comparators detecting when a voltage signal exceeds a voltage threshold.

Preferably the audio user interface is activated when voltage range information of the one or more voltage signals of the converted audio frequency domain signal matches voltage range information of the audio trigger command.

Preferably the method comprises determining that the audio frequency domain signal matches the audio trigger command when the difference between the voltage range information of the converted audio frequency domain signal and the voltage range information of the audio trigger is less than a threshold.

Preferably the voltage range information of the audio trigger command is determined before the audio frequency domain signal is captured.

Preferably the audio frequency signal is converted into one or more voltage signals with a frequency-to-voltage converter. Preferably the audio frequency domain signal is received from a microphone.

Preferably the determining comprises storing the one or more voltage signals in a buffer for a time period.

Preferably the determining the characteristics of the one or more voltage signals is carried out over a time period.

Preferably the activating comprises sending a signal configured to activate another processor configured to perform the audio user interface.

In another embodiment there is provided an apparatus comprising: a frequency to voltage converter configured to convert an audio frequency domain signal into one or more voltage signals; a plurality of voltage determiners configured to determining the characteristics of the one or more voltage signals; a processor configured to compare the characteristics of the one or more voltage signals with one or more characteristics of an audio trigger command and initiate activation of an audio user interface on the basis of the comparison.

Preferably the plurality of voltage determiners are configured to determine whether the one or more voltage signals are in one of a plurality of adjacent voltage ranges. Preferably the voltage determiners quantize one or more voltage signals. More preferably the voltage determiners are configured to sort one or more voltage signals into one or more different voltage ranges. Preferably the one or more different voltage ranges are predetermined or dynamically determined.

Preferably the plurality of voltage determiners are a plurality of voltage comparators, the voltage comparators configured to detect when a voltage signal exceeds a voltage threshold.

Preferably the processor is configured to activate the audio user interface when voltage range information of the one or more voltage signals of the converted audio frequency domain signal matches voltage range information of the audio trigger command.

Preferably the processor is configured to determine that the audio frequency domain signal matches the audio trigger command when the distance between the voltage range information of the converted audio frequency domain signal and the voltage range information of the audio trigger is less than a threshold.

Preferably the processor is configured to determined the voltage range information of the audio trigger command before the audio frequency domain signal is captured. Preferably the audio frequency domain signal is received from a microphone.

Preferably the apparatus comprises a buffer configured to store the one or more voltage signals in for a time period. Preferably the processor is configured to determine the characteristics of the one or more voltage signals over a time period.

Preferably the processor is configured to send a signal for activating another processor configured to perform the audio user interface.

In another embodiment there is a computer program comprising code means adapted to perform the steps of any of the previous methods.

In yet another embodiment there is provided an apparatus comprising; means for converting an audio frequency domain signal into one or more voltage signals; means for determining the characteristics of the one or more voltage signals; means for comparing the characteristics of the one or more voltage signals with one or more characteristics of an audio trigger command; and means for initiating activation of an audio user interface on the basis of the comparison.

BRIEF DESCRIPTION OF THE DRAWINGS

For a better understanding of the present application and as to how the same may be carried into effect, reference will now be made by way of example to the accompanying drawings in which.

DETAILED DESCRIPTION

The following describes apparatus and methods for activating an audio user interface with an audio trigger, such as a voice trigger command.

Figure 1:
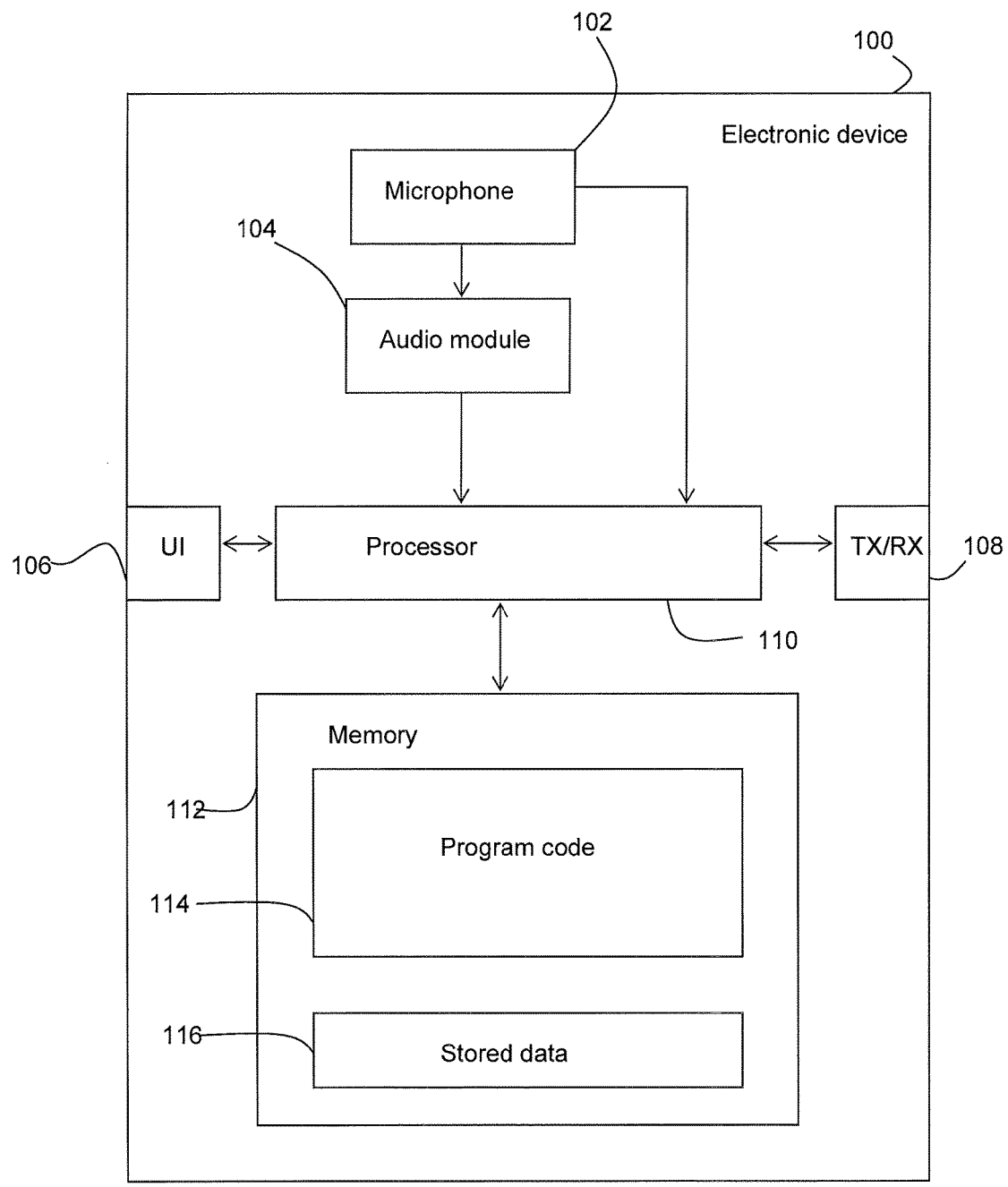
FIG. 1 illustrates a schematic block diagram of an apparatus according to some embodiments.

In this regard reference is made to FIG. 1 which discloses a schematic block diagram of an example electronic device 100 or apparatus suitable for employing embodiments of the application. The electronic device 100 is configured to provide an audio user interface, such as a voice activated user interface according to some embodiments.

The electronic device 100 is in some embodiments a mobile terminal, a mobile phone or user equipment for operation in a wireless communication system. In other embodiments, the electronic device is a digital camera, a camcorder, a portable dictation device, personal digital assistant (PDA), laptop or any other electronic device suitable for capturing sound.

The electronic device 100 comprises a microphone 102 connected to an audio module 104 which is linked to a processor 110. The processor 110 is linked to a transceiver (TX/RX) 108, to a user interface (UI) 106 and to memory 112.

The processor 110 in some embodiments can be configured to execute various program codes. For example, the implemented program code can comprise a code for controlling the microphone 102 to capture sound. The implemented program codes, in some embodiments, comprise audio digital processing or configuration code. The implemented program codes in some embodiments further comprise additional code for further processing of audio signals. The implemented program codes can in some embodiments be stored, for example, in the memory 112 and specifically in a program code section 114 of the memory 112 for retrieval by the processor 110 whenever needed. The memory 112 in some embodiments can further provide a section 116 for storing data, for example, data that has been processed in accordance with the application.

The electronic device 100 can comprise an audio module 104 or any suitable means for detecting a voice trigger command. The audio module 104 is connected to a microphone 102 or other suitable audio transducer or means for capturing audio in the environment of the electronic device 100. The audio module 104 in some embodiments can be an application specific integrated circuit. Alternatively or additionally the audio module 104 can be integrated with the electronic device 100. In other embodiments the audio module 104 can be separate from the electronic device 100. This means the processor 110 in some embodiments can receive a modified signal from an external device comprising the audio module 104.

The microphone 102 in some embodiments can be an audio sensor comprising a dynamic or moving coil, a piece of electric transducer, an electrostatic transducer or a transducer array comprising microelectromechanical systems (MEMS) microphone, electret condenser microphone (ECM) or any other suitable means or microphone components for capturing sound. Additionally or alternatively the microphone 102 comprises a multi function device (MFD). In some preferred embodiments the microphone 102 is an MEMS microphone comprising a microphone membrane.

In some embodiments a MEMS microphone can be used. A MEMS microphone offers some advantages over an electret condenser microphone (ECM), including advantages in manufacturability, production volume scalability and stability in varying environments, as non-limiting examples. It can be challenging to design an acoustically optimized MEMS microphone package because package design requirements are largely set by the mechanical interfaces of the device in which the MEMS microphone is to be used. For example, the design requirements may depend on how and where the MEMS microphone is integrated in the device.

In some embodiments, the MEMS microphone comprises two components: a MEMS chip and an application specific integrated circuit (ASIC) chip. Both the MEMS and ASIC chips are mounted on a substrate printed wiring board (PWB) and are connected together with at least one bond wire. The microphone is incorporated in a casing that has one or more sound ports for receiving acoustic pressure waves. The MEMS chip can for example includes a condenser microphone element etched in silicon. The ASIC chip in some embodiments include a pre-amplifier, an analogue-to-digital converter and a charge pump for biasing the MEMS microphone element. In some embodiments, the MEMS chip elements are included in the ASIC. Moreover, the ASIC can include an analogue-to-digital converter (ADC) and/or a charge pump, for example. The ASIC detects the capacitive variations, converts them into electrical signals and passes them to appropriate processing means, such as a baseband processor or an amplifier.

Figure 2:
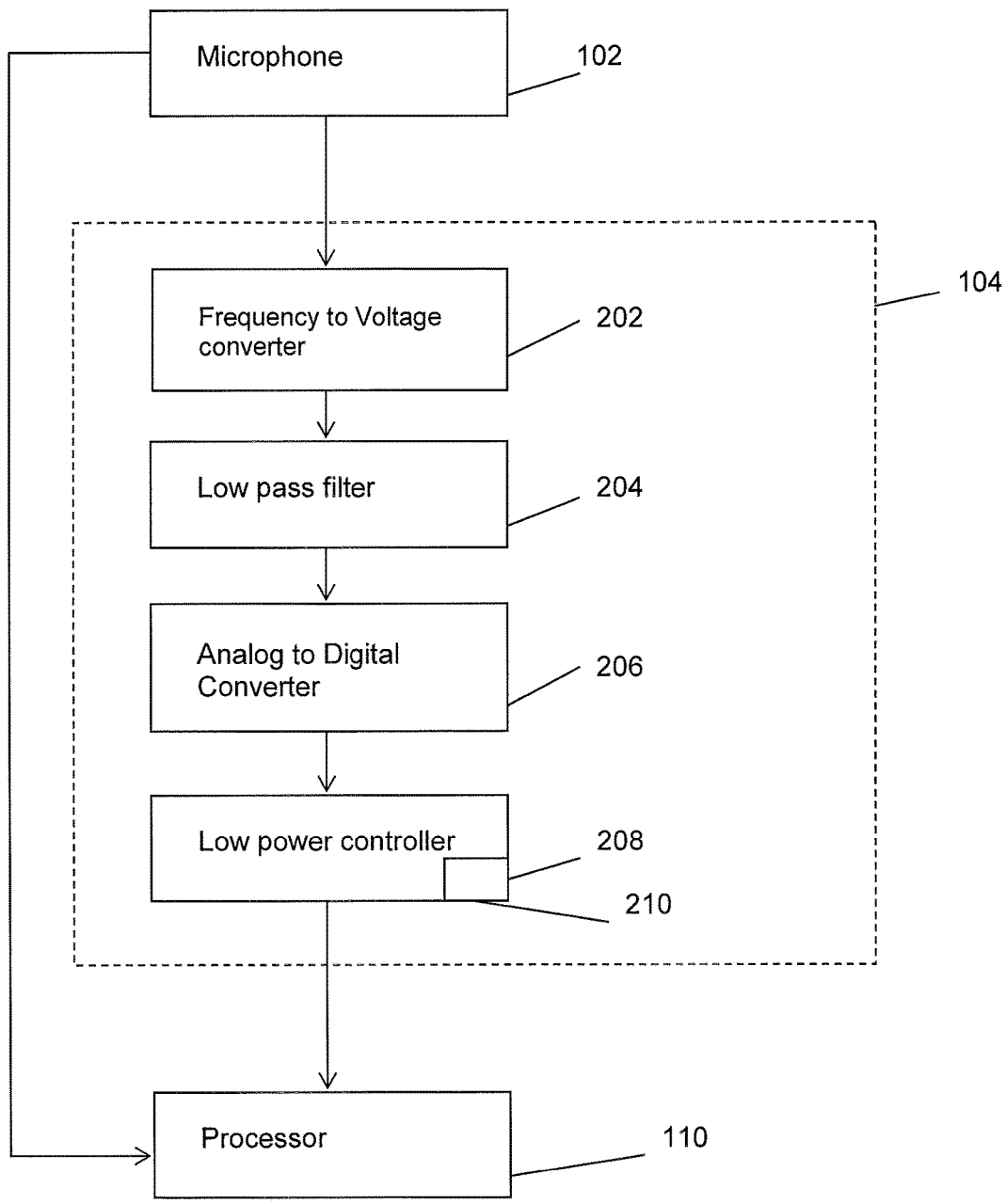
FIG. 2 illustrates an expanded schematic view of an apparatus according to some embodiments.

The audio module 104 will now be discussed in reference to FIG. 2. FIG. 2 discloses an expanded schematic view of the microphone 102, the audio module 104 and the processor 110.

In some embodiments the processor 110 is linked by the audio module 104 to the microphone 102 and the microphone 102 can detect sound from the environment of the electronic device 100 and generate a signal. The microphone 102 sends the signal to the frequency-to-voltage converter 202. The frequency-to-voltage converter 202 converts the frequency of the pulse received from the microphone 102 to a voltage. The frequency-to-voltage converter 202 outputs a voltage which is proportional to sound frequency. The output signal of the frequency-to-voltage converter 202 is sent to an optional low pass filter 204 for removing noise from the signal. The low pass filter 204 then sends the filtered signal to an analogue-to-digital converter 206. The analogue-to-digital converter digitises the analogue signal and the digital output from the analogue-to-digital converter 206 is sent to a low power controller 208. The low power controller 208 can analyse the digital output of the analogue-to-digital converter 206 and can send a signal to the processor 110.

Figure 3:
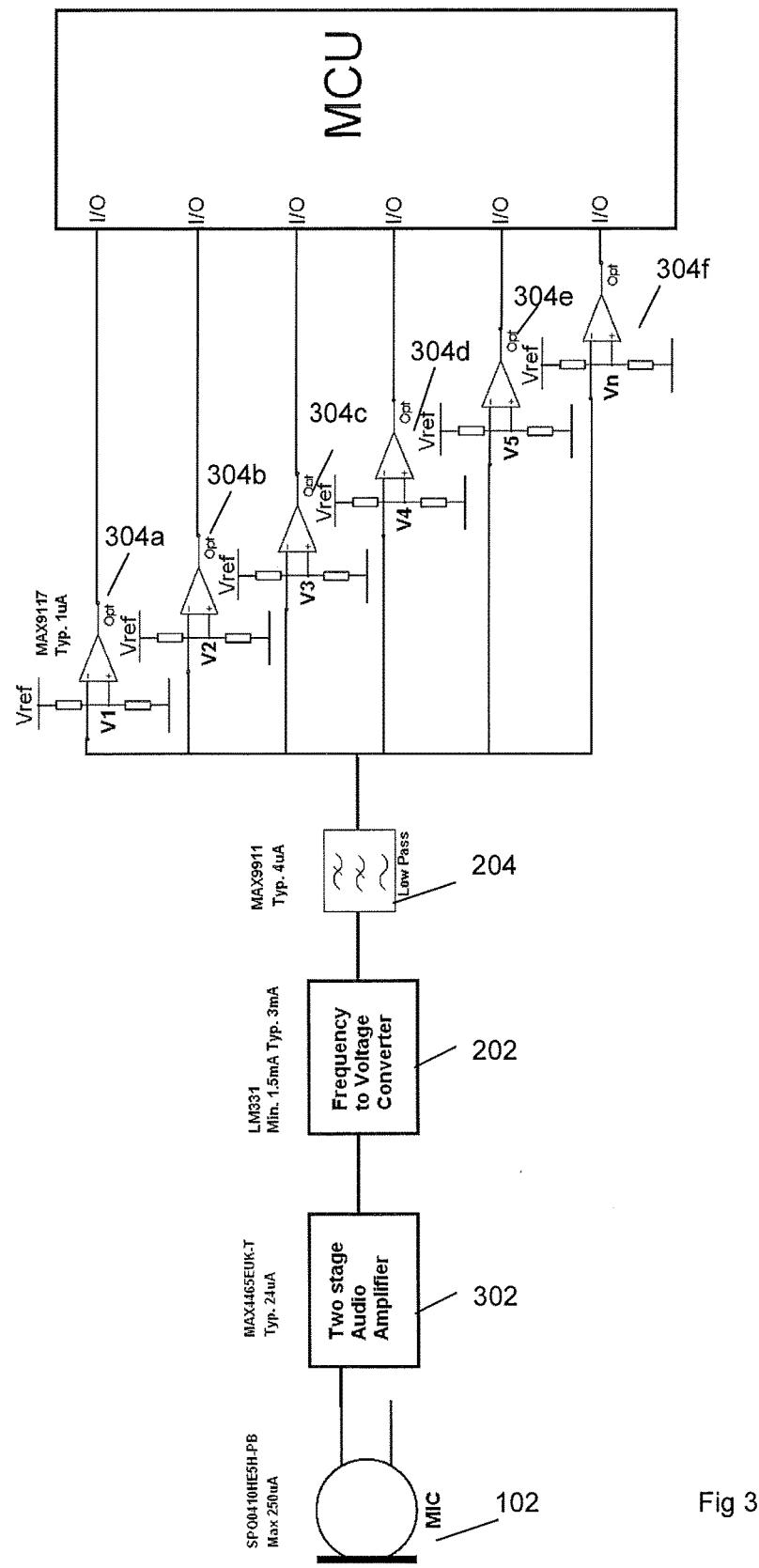
FIG. 3 shows an apparatus according to some other embodiments.

FIG. 3 illustrates a circuit diagram of an apparatus according to some embodiments. In some embodiments the output from the microphone 102 is sent to an amplifier 302. The output from the microphone 102 can be amplified depending on the signal. In some embodiments no amplification may be needed if the output from the microphone 102 is above a certain threshold.

The output from the amplifier 302 is sent to the frequency-to-voltage converter 202, the low pass filter 204, the analogue-to-digital converter 206 and the low power controller 208 as discussed with the embodiments as illustrated in FIG. 2.

In some embodiments the analogue-to-digital converter 206 comprises a plurality of comparators 304*a*, 304*b*, 304*c*, 304*d*, 304*e*, 304*n*. The outputs of each comparator are connected to the low power controller 208 or suitable means for controlling. In some embodiments the low power controller 208 is a microcontroller.

In some embodiments the analogue-to-digital converter does not encode an analogue signal to a digital signal. The analogue-to-digital converter comprises comparators 304*a*, 304*b*, 304*c*, 304*d*, 304*e*, 304*n* which are configured to quantized the analogue signal. In this way, the analogue-to-digital converter can comprise any suitable means for quantizing the analogue signal.

Figure 4:
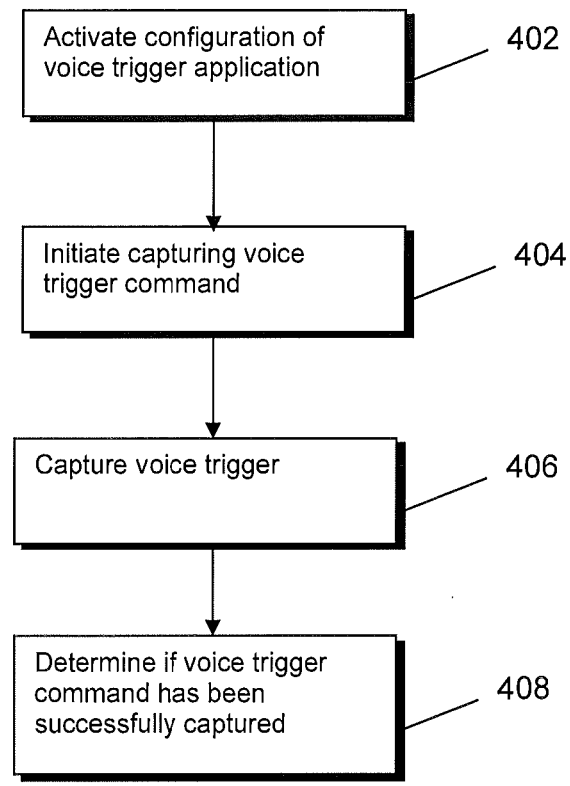
FIG. 4 illustrates a flow diagram of capturing a voice trigger command according to some embodiments.
Figure 5:
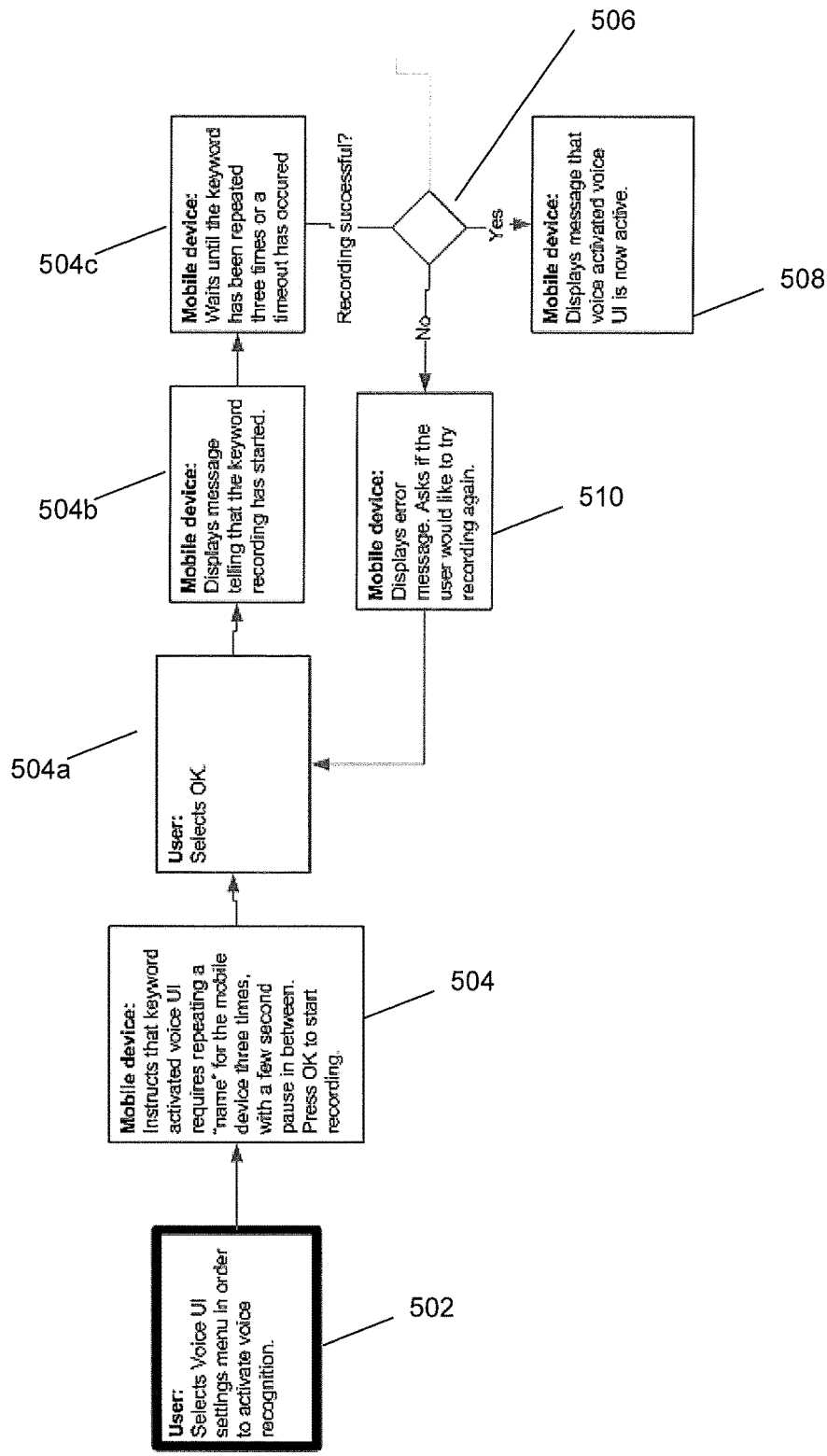
FIG. 5 illustrates a more detailed method for capturing a voice trigger command according to some embodiments.

The implementation of activating an audio user interface with the electronic device 100 as shown in FIG. 1 will now be described with reference to FIGS. 4 and 5. FIGS. 4 and 5 illustrate flow diagrams of a method for capturing a voice trigger command for configuring the electronic device 100 according to some embodiments.

In some embodiments a user may wish to activate a speech recognition functionality of an electronic device 100 without handling the electronic device 100. In order for the electronic device to efficiently provide a complete hands-free audio user interface, a voice trigger command is captured during a configuration procedure. The captured voice trigger command is then subsequently used to compare other voice commands captured by the electronic device 100.

A user activates the configuration of a voice trigger application as shown in step 402. A user can configure the voice trigger application by selecting an appropriate setting of the electronic device 100. The voice trigger application can be stored in some embodiments in the memory 112 of the electronic device 100. The processor 110 then executes the voice trigger application. After the voice trigger application has been activated, the processor 110 captures the voice trigger command initiated as shown in step 404. The user then provides a voice trigger command to the electronic device 100 which can subsequently trigger the audio user interface for the user as shown in step 406. The processor 110 can store the captured voice trigger command in memory 112.

The same voice trigger command provided by the user at a later time can then be spoken aloud by the user and used to activate the audio user interface.

Once the processor 110 has captured the voice trigger command and stored the voice trigger command in memory 112, the processor 110 determines if the voice trigger command has been successfully captured. If the user needs to repeat the voice trigger command again, the processor 110 repeats the step of 406.

Some embodiments will now be described with reference to FIG. 5. FIG. 5 discloses a more detailed flow diagram for capturing the voice trigger command. The user initiates the configuration of the voice trigger application as shown in step 502, which is similar to the step of 402. In some embodiments a user selects the voice user interface settings in a menu in the electronic device 100 in order to activate the voice recognition. The user then indicates to the electronic device 100 that capturing the voice trigger command is to be initiated as shown in step 504. Step 504 is represented in FIG. 5 as several discrete sub steps 504*a*, 504*b*, 504*c*. In some embodiments the user can indicate to the electronic device that the voice trigger command is to be captured by manually inputting an instruction as shown in step 504*a*. In some embodiments the user can select "OK" manually from the user interface of the electronic device 100 to start the voice trigger command capture. In some other embodiments the processor 110 can start recording to capture the voice trigger command after a period of time.

The electronic device 100 instructs the user that a voice trigger command is required for activating the audio user interface. For example in some embodiments the electronic device 100 can prompt the user to provide a voice trigger command as shown in step 504*b*. The user may then provide a name or a "magic word" for the voice trigger command, which the user wants to use as a trigger for activating the audio user interface of the electronic device 100.

In some embodiments the user repeats the voice trigger command a number of times as shown in step 504*c*. In some embodiments, the processor 110 detects the start and the end of the voice trigger command by detecting silence between repetitions of the voice trigger command spoken by the user.

In the example shown in FIG. 5 the trigger command word is entered three times, however trigger command word entry can be more or less than 3 times.

The user provides a voice trigger command aloud and the microphone 102 detects the voice trigger command. The microphone 102 can then send the analogue signal to audio module 104 for capturing the voice trigger command and configuring the low power controller 208. The signals from the microphone 102 are send to the analogue-to-digital converter via the frequency-to-voltage converter 202 and the low pass filter 204 as discussed with reference to FIGS. 2 and 3.

In some embodiments the analogue-to-digital converter 206 comprises a set of comparators 304a-304n which are used to cover a frequency range. In some embodiments a plurality of comparators can be used to cover a range from 0 Hz to 5 kHz or any suitable frequency range for detecting voice sounds. The comparators can be configured to detect frequencies separated by steps of 1000 Hz.

For example the voice trigger command could be "activate". A user may pronounce the voice trigger command "activate" as three separate syllables or sounds.

The voice trigger commands can have syllables which have different frequency spectrums and therefore detection of difference syllables can be made with a relatively coarse analogue-to-digital converter.

Figure 8:
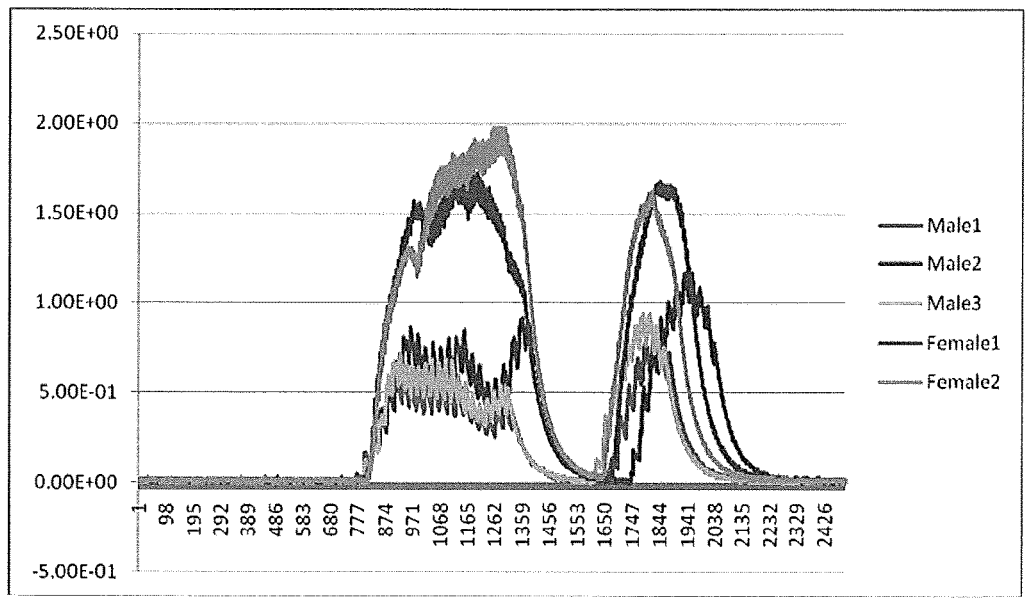
FIG. 8 illustrates an output of a frequency-to-voltage converter with a speech synthesizer saying "wake up" with different parameters.
Figure 9:
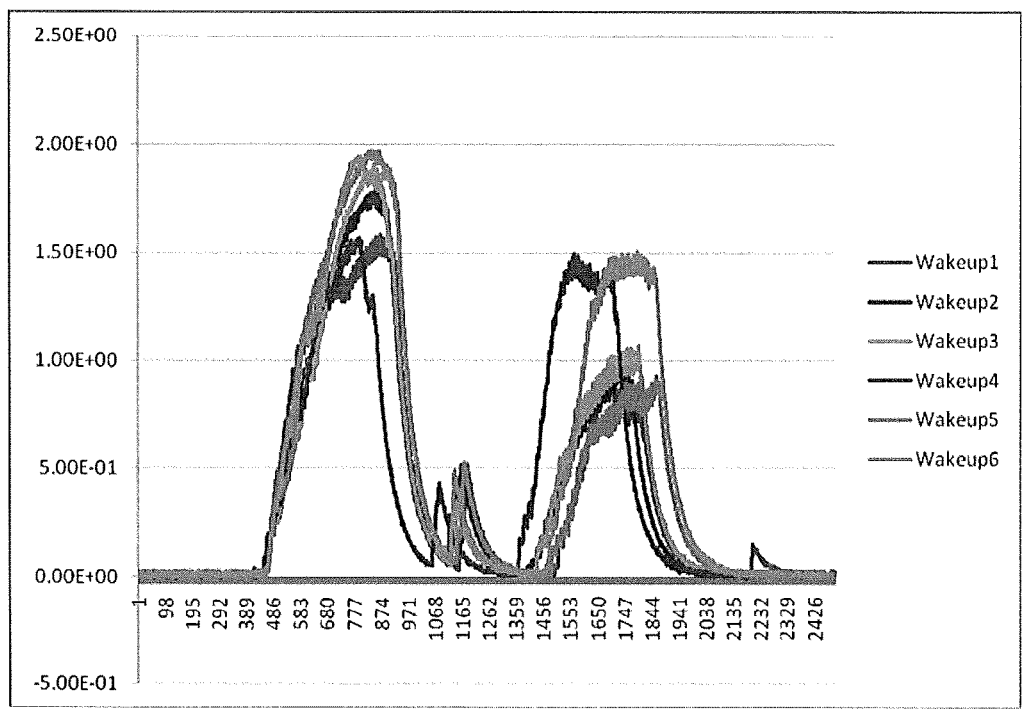
FIG. 9 illustrates an output of a frequency-to-voltage converter with voice samples of the same person saying "wake up"

In this way, if the voice trigger command is the word "activate", the voice trigger command comprises three syllables of "ak", "thi" and "veit". Each syllable has different frequency components and the comparator 304a-304n outputs can be different for each syllable. For example the comparator 304a-304n outputs might be 000011, 011111 and 000111 for the syllables "ak", "thi" and "veit" respectively. FIG. 8 shows the output of the frequency-to-voltage converter of a speech synthesiser saying the phrase "wake up" using different parameters. FIG. 8 illustrates that different parameters such as cadence, pitch, intonation can affect the output. FIG. 9 shows the output of the frequency-to-voltage converter showing of the same person saying the phrase "wake up" a number of times. FIG. 9 illustrates that variations in speech can occur even when the same person says the same phrase different times.

The processor 110 determines when the low power controller 208 has detected the same voice trigger command if the low power controller 208 indicates to the processor 110 that the outputs of the comparators 304a-304n for the voice trigger command are the same over a plurality of repetitions. If the processor 110 determines that the capture of the voice trigger command was successful, as shown in step 506, the processor 110 indicates to the user that the voice activated audio user interface is active as shown in step 508.

If the processor 110 determines that the voice trigger command has not been repeated a plurality of times the processor is configured to initiate display an error message to the user. In some embodiments the electronic device 100 can display a prompt to ask if the user would like to try recording again as shown in step 510.

When the processor 110 determines that the voice trigger command has been successfully captured, the microcontroller stores the voice trigger command in a lookup table in a memory 210 of the low power controller 208.

Figure 6:
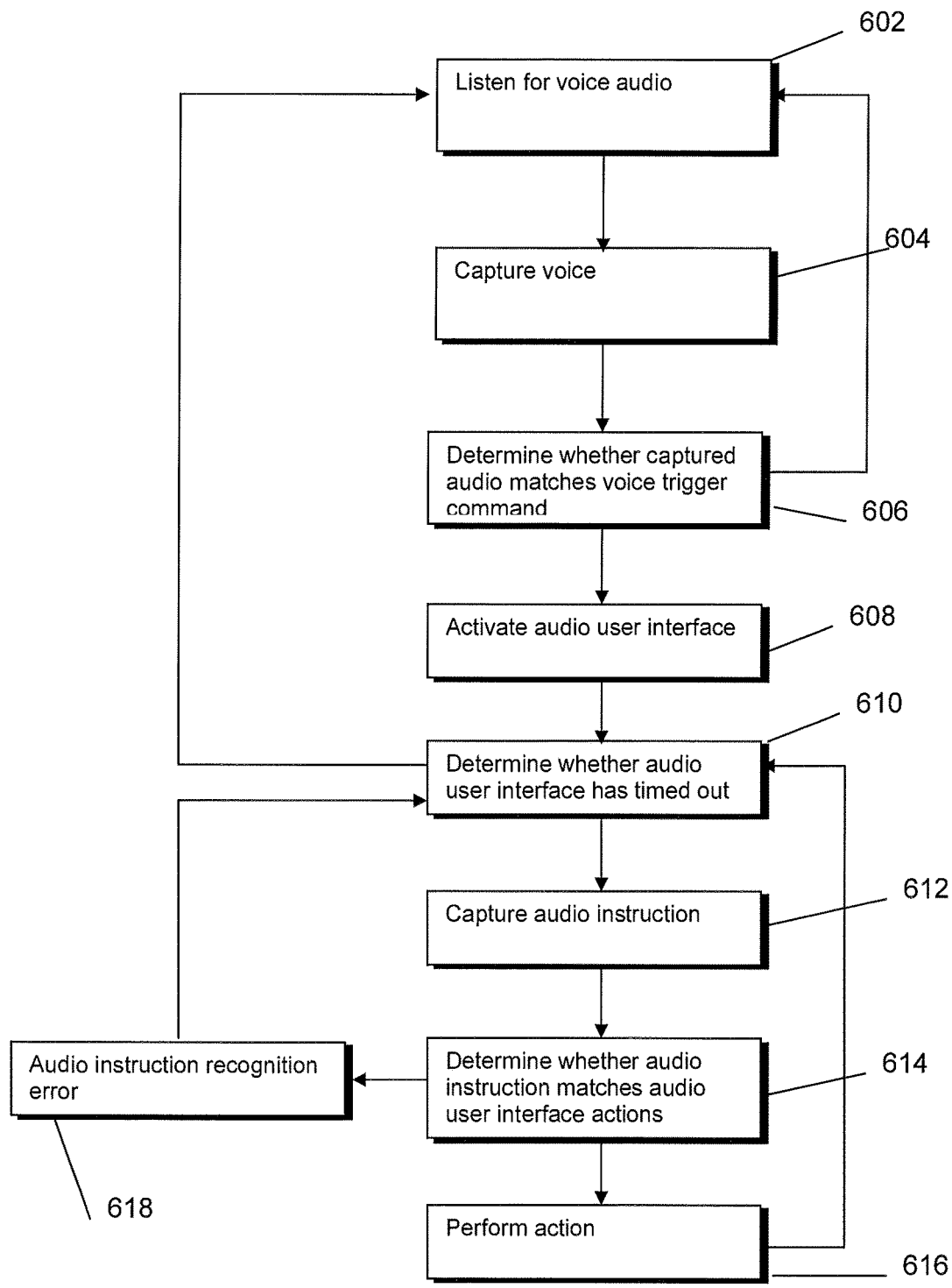
FIG. 6 illustrates a flow diagram of a method according to some embodiments.

The implementation of activating an audio user interface having successfully detected a voice trigger command will now be described with reference to FIG. 6. FIG. 6 discloses a flow diagram illustrating some embodiments for activating an audio user interface.

The microphone 102 can be configured to, in some embodiments, "listen" for audio, and in particular voice sounds, as shown in step 602. In some embodiments the microphone 102 is constantly detecting audio in the environment of the electronic device 100. Alternatively, in some embodiments the microphone periodically "listens" or detects for audio in the environment of the electronic device 100.

When a user gives the voice trigger command, for example "activate", the microphone 102 sends the analogue signals to the frequency-to-voltage converter 202. The frequency-to-voltage converter will output a voltage depending on a dominant frequency component at its input. The output of the frequency-to-voltage converter 202 is sent to a low pass filter 204. The low pass filter suppresses any frequency changes which are faster than frequency changes of an average word. In this way, the output of the low pass filter 204 comprises predominately of voice frequencies. The low pass filter 204 can in some embodiments output the signal to the comparators 304a-304n of the analogue-to-digital converter. Each comparator 304a-304n is configured to detect a particular voltage level which corresponds to a range of frequencies because the frequency-to-voltage converter provides a linear conversion of frequency to voltage. This means that since the outputs of the comparators 304a-304n are connected to the low power controller 208, the lower power controller 208 can make an approximate determination of the frequencies captured by the microphone 102.

The comparators 304a-304n are components configured to determine when an input voltage is lower or higher than a given reference voltage. The comparators 304a-304n are configured to output a signal of "1" or "0" depending on the determination of whether the input voltage is lower or higher than the reference voltage. The voice trigger command comprises a frequency range which when the voice trigger command is input into the frequency to voltage converter 202 has an associated voltage range. In some embodiments the threshold voltages of the comparators are selected to divide the voltage range of a voice trigger command output from the frequency to voltage converter 202 into equal amounts. In some alternative embodiments other methods of dividing up the voltage range can be used including one or more of pseudo-acoustic divisions, log divisions or overlapping divisions. In some embodiments the voltage range is divided into exponential threshold, such that the thresholds of the comparators 304a-304n satisfy the following (1):

$$\text{Threshold voltage} = k*2^n \qquad (1)$$

where k is a constant and n is the number of the comparator.

In some embodiments, the plurality of comparators are configured to detect a plurality of voltage levels V1, V2, . . . , Vn. In some embodiments the comparators have threshold voltages of 0.1V, 0.2V, 0.4V, 0.8V within a 0-1.6 output voltage swing or peak to trough amplitude of the voltage signal. In some other embodiments the thresholds of the comparators 304a-304n are configured to generate an equal number of transitions for the voice trigger command. In some embodiments the thresholds of the comparators 304a-304n are set during the configuration of the user interface as described in reference to FIG. 4. For example, the thresholds are set with respect to the captured voice trigger command during step 408.

Once the microphone 102 has captured the audio as shown in step 604, the low power controller 208 determines whether the captured audio matches the voice trigger command as shown in step 606.

Figure 7:
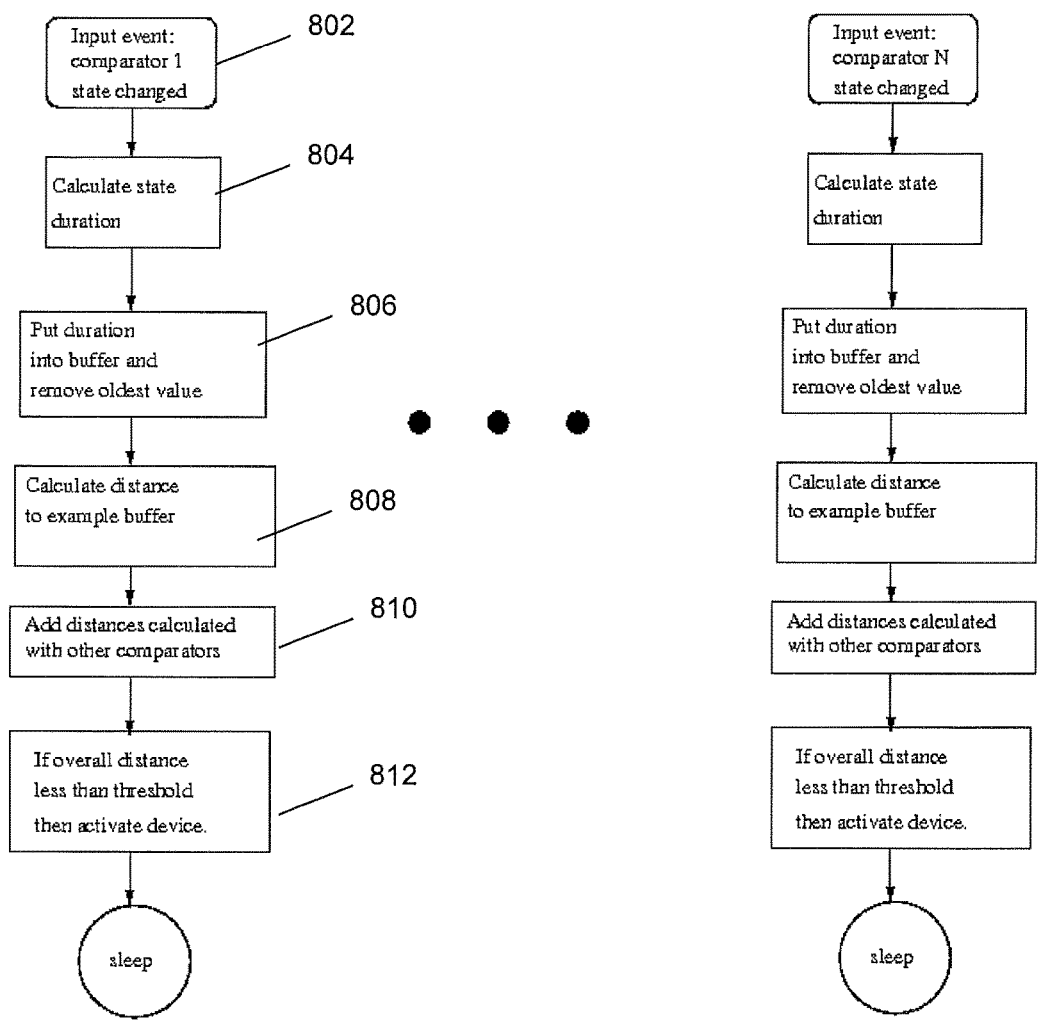
FIG. 7 illustrates a schematic representation of an algorithm according to some embodiments.

The determination whether the captured audio matches the voice trigger command stored in the low power controller 208 lookup table will now be discussed with reference to FIG. 7. FIG. 7 discloses an algorithm for determining the state of the comparators 304a-304n and activating the low power controller 208 on the basis thereof.

Figure 10:
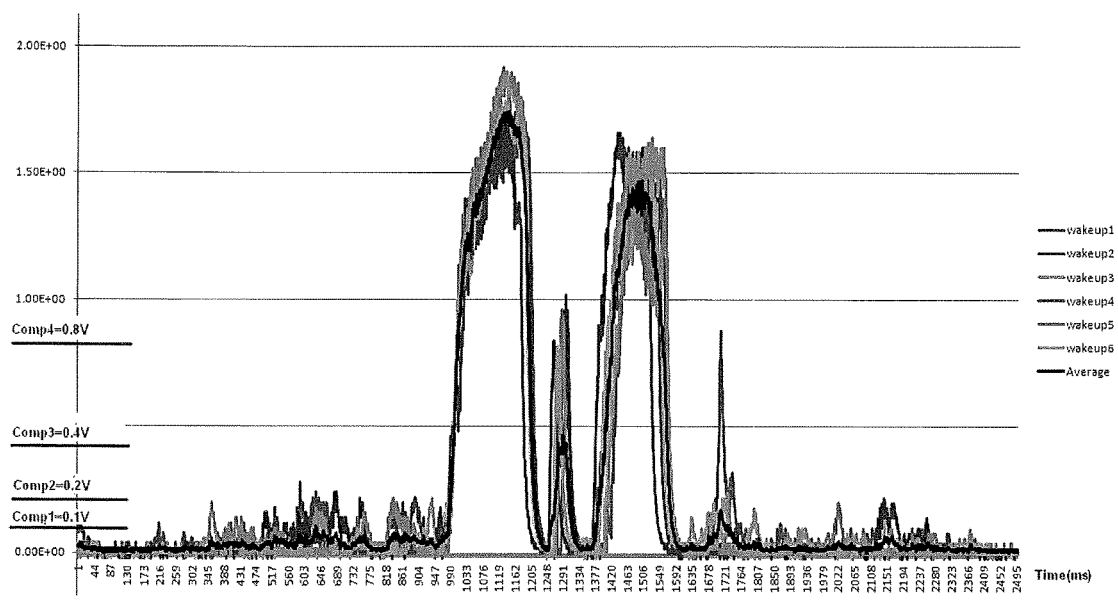
FIG. 10 illustrates a spectrum of the words "wake up" spoken by the same speaker.

Each comparator 304a-304n can in some embodiments be described as having a state of "0" or "1". A state of 0 reflects a negative state that no voltage equal to or higher than the predetermined voltage level is present and a second state 1 which reflects a positive state that a voltage equal to or higher than a predetermined level is detected. For example, a comparator when no audio is detected in a frequency range associated with the comparator, the comparator is in a negative state (e.g. 0). FIG. 10 illustrates frequency to digital conversion compared against selected reference voltages of the comparators in some embodiments.

Each comparator state can be measured using an internal timer and the value of each comparator can be stored in an input buffer included in each comparator 304a-304n. From each comparator 304a-304n a transition time is associated with each value. Values are ordered by their transition times wherein the most recent transition time is put first and the oldest value is discarded. This means when a new value is determined, the oldest value is discarded. When the microphone 102 detects audio which is a voice trigger command one or more of the comparators may change state as shown in step 802. The microcontroller 208 then determines the state duration as shown in step 804. The state duration can be put into the buffer and the oldest value in the buffer is removed as shown in step 806. The low power controller 208 then determines the Euclidian distance of the values signals received at one or more comparators 304a-304n to the values of the pre-recorded voice trigger command stored in the memory 210 of the low power controller 208 as shown in step 808. The low power controller 208 can then calculate the total Euclidian distance for all other comparators using the equation [1].

$$\text{sqrt}(\text{sum}\_i(\text{pow}(\text{buffer}[i]-\text{model}[i],2))) \qquad [1]$$

If the result of the Euclidian distance is lower than a threshold then the low power controller 208, in some embodiments, can wake the processor 110 from a sleep mode, in which the processor 110 uses a small amount of power.

This means that the "signature" of the captured audio is compared to the "signature" of the trigger word. When the error variation of the captured audio is small compared to the recorded trigger word, the captured audio is accepted and the low power controller 208 initiates activating the processor 110. Once the low power controller 208 determines that the captured audio matches the voice trigger command then the microcontroller initiates activating the processor 110 to activate the audio used interface as shown in steps 608 and 812. The low power controller 208 can then send an interrupt to the processor 110. The processor 110 can activate on receiving the interrupt from the low power controller 208 and the processor can be configured to perform speech recognition tasks. Alternatively, when the result is higher than a predetermined threshold then the low power controller 208 does not wake the processor 110 from sleep.

In some embodiments, the processor 110 then waits for the microphone 102 to capture further audio from the environment of the electronic device 100. In some embodiments the microphone can send signals to the processor 110 without sending them to the audio module. In some other embodiments when the processor 110 is active, the signals from the microphone 102 are sent to another analogue-to-digital converter (not shown). The other analogue-to-digital converter can comprise more comparators and provide a greater frequency resolution than with respect to the analogue-to-digital converter comprised in the audio module 204.

The processor can determine whether the audio user interface has timed out as shown in step 610. This means that the processor 110 in some embodiments can only perform the user interface action when the processor 110 determines that an audio instruction has been provided within a predetermined time limit. In some embodiments, the predetermined time limit can be 1 minute or any other suitable time limit for received audio instructions. This means that even when the voice trigger command is recognised in normal speech the processor 110 can time out and return to a sleep mode before a valid instruction of the audio user interface is captured. It should be unlikely that the voice trigger command will be unintentionally followed with a valid audio user interface command, especially when the user selects a distinctive word as the voice trigger command.

When the processor 110 determines that the audio user interface has not timed out the processor 110 can capture audio in the environment of the electronic device 100 as shown in step 612. The processor 110 determines whether the audio instruction captured in step 612 matches audio user interface actions as shown in step 614. The audio user interface as shown in step 614 can use speech recognition techniques such as fast Fourier transforms. In some embodiments the processor uses other speech recognition algorithms. When the processor 110 determines that an audio instruction has been issued, the processor 110 can initiate performing the action associated with the audio instruction as shown in step 616. Alternatively, when the processor 110 determines that there is an audio instruction recognition error, for example when the captured voice is not a valid audio instruction, as shown in step 616, the processor 110 can repeat the capture of audio instruction 612 until the processor 110 has determined whether the audio user interface has timed out.

When the audio user interface has timed out, then the processor 110 can return to a sleep mode and the low power controller 208 can again listen for the voice trigger command. Advantageously an electronic device such as a mobile phone can be woken up from sleep without a user touching the device. Some embodiments prove an arrangement whereby a low power microcontroller is always on and determines whether the voice trigger command has been issued and if so the processor which executes the full speech recognition is activated. This means that battery life can be extended and the electronic device can provide a fully hands free experience for a user.

It shall be appreciated that the term electronic device and user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits (such as field programmable gate array—FPGA circuits) and processors based on multi-core processor architecture, as non-limiting examples.

Embodiments of the inventions may be practiced in various components such as integrated circuit modules. The design of PWB and RF designs are by and large a highly automated process. Complex and powerful software tools are available for converting a design into a Printed Wired Board design ready to be etched and formed on a substrate.

Programs automatically route conductors and locate components on a substrate using well established rules of design as well as libraries of pre-stored design modules. Once the design for a substrate or circuit has been completed, the resultant design, in a standardized electronic format may be transmitted to a fabrication facility or for fabrication.

As used in this application, the term 'circuitry' refers to all of the following:
(a) hardware-only circuit implementations (such as implementations in only analogue and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

Indeed in there is a further embodiment comprising a combination of one or more of any of the other embodiments previously discussed.

The invention claimed is:

1. A method for an audio user interface comprising:
monitoring audio in an environment around an electronic device by at least one microphone of the electronic device;
detecting a voice command during monitoring, wherein the voice command is configured to trigger the audio user interface;
converting at least one syllable of the detected voice command into one or more voltage signals, wherein each syllable of the at least one syllable is associated with a frequency range;
determining one or more voltage levels based on the one or more voltage signals, comprising determining one or more voltage levels for each associated frequency range;
comparing of the determined one or more voltage signals levels with one or more voltage levels of an audio trigger command within the electronic device, wherein the audio trigger command is predetermined; and
initiating activation of a user interface action when the detected voice command matches the audio trigger command based on the comparison.

2. The method according to claim 1 wherein the determining the one of more voltage signals comprises determining whether the one or more voltage signals are in one of a plurality of adjacent voltage ranges.

3. The method according to claim 2 wherein the one or more voltage levels are defined by a plurality of voltage comparators each associated with a voltage threshold, and wherein the plurality of voltage comparators divide the one or more voltage levels for each different frequency range over a plurality of adjacent voltage ranges based on determining that a voltage signal exceeds an associated voltage threshold.

4. The method according to claim 2 wherein the user interface action is activated when voltage range information of the one or more voltage signals of the converted at least one syllable of the detected voice command matches voltage range information of the audio trigger command.

5. The method according to claim 4 wherein the method comprises determining that the voice command matches the audio trigger command when the difference between the voltage range information of the converted at least one syllable of the detected voice command and the voltage range information of the audio trigger is less than a voltage threshold.

6. The method according to claim 4 wherein the voltage range information of the audio trigger command is determined before the voice command is detected.

7. The method according to claim 1 wherein the at least one syllable of the detected voice command is converted into one or more voltage signals with a frequency-to-voltage converter.

8. The method according to claim 1 wherein the determining comprises storing the one or more voltage signals in a buffer for a time period.

9. The method according to claim 1 wherein the determining the one or more voltage signals is carried out over a time period.

10. The method according to claim 1 wherein the initiating activation comprises sending a signal configured to activate another processor configured to perform the user interface action.

11. An apparatus comprising:
at least one processor; and
at least one memory including computer program code, where the at least one memory and the computer program code are configured, with the at least one processor, to cause the apparatus to at least:
monitor audio in an environment around an electronic device by at least one microphone of the electronic device;
detect a voice command during monitoring, wherein the voice command is configured to trigger the audio user interface;
convert at least one syllable of the detected voice command into one or more voltage signals, wherein each syllable is associated with a frequency range;
determine one or more voltage levels based on the one or more voltage signals, comprising determining one or more voltage levels for each associated frequency range;
compare the determined one or more voltage levels with one or more voltage levels of an audio trigger command within the electronic device, wherein the audio trigger command is predetermined;
and initiate activation of a user interface action when the detected voice command matches the audio trigger command based on the comparison.

12. The apparatus according to claim 11 wherein the at least one memory including the computer program code is configured with the at least one processor to cause the apparatus to determine whether the one or more voltage signals are in one of a plurality of adjacent voltage ranges.

13. The apparatus according to claim 11 wherein the at least one memory including the computer program code is configured with the at least one processor to cause the apparatus to use a plurality of voltage comparators to define the one or more voltage levels, wherein the plurality of voltage comparators divide the one or more voltage levels for each different frequency range over the plurality of adjacent voltage ranges based on determining that a voltage signal exceeds an associated voltage threshold.

14. The apparatus according to claim 11 wherein the at least one memory including the computer program code is configured with the at least one processor to cause the apparatus to activate the user interface action when voltage range information of the one or more voltage signals of the converted at least one syllable of the detected voice command matches voltage range information of the audio trigger command.

15. The apparatus according to claim 14 wherein the at least one memory including the computer program code is configured with the at least one processor to cause the apparatus to determine that the voice command matches the audio trigger command when the distance between the voltage range information of the converted at least one syllable of the detected voice command and the voltage range information of the audio trigger is less than a voltage threshold.

16. The apparatus according to claim 14 wherein the at least one memory including the computer program code is configured with the at least one processor to cause the apparatus to determine the voltage range information of the audio trigger command before the voice command is detected.

17. The apparatus according to claim 11 wherein the apparatus comprises a buffer configured to store the one or more voltage signals in for a time period.

18. The apparatus according to claim 11 wherein the at least one memory including the computer program code is configured with the at least one processor to cause the apparatus to determine the one or more voltage signals over a time period.

19. The apparatus according to claim 11 wherein the at least one memory including the computer program code is configured with the at least one processor to cause the apparatus to send a signal for activating another processor configured to perform the user interface.

20. The method according to claim 1, wherein the monitoring is based on a selection of activation of a voice user interface from a settings menu of the audio user interface and the audio user interface displaying an indication that the monitoring has started.

21. The method according to claim 20, wherein the detecting is based on a detection of the voice command three consecutive times or detection of the voice command within a predetermined time period following the displayed indication.

22. The method according to claim 1, wherein converting the at least one syllable of the detected voice command into one or more voltage signals is identifying a particular user voice from which the voice command is detected.

* * * * *

UNITED STATES PATENT AND TRADEMARK OFFICE
CERTIFICATE OF CORRECTION

PATENT NO.      : 9,921,803 B2  
APPLICATION NO. : 13/817957  
DATED           : March 20, 2018  
INVENTOR(S)     : Jari Tuomas Savolainen, Jukka Mikael Jalkanen and Jyrki Porio Page 1 of 1

It is certified that error appears in the above-identified patent and that said Letters Patent is hereby corrected as shown below:

In Claim 1:
Column 12, Line 34, "of the" should be deleted and --the-- should be inserted.

In Claim 1:
Column 12, Line 34, "signals" should be deleted.

Signed and Sealed this  
Twenty-fourth Day of April, 2018

Andrei Iancu  
*Director of the United States Patent and Trademark Office*